United States Patent [19]
Bouyoucos et al.

[11] Patent Number: 5,841,733
[45] Date of Patent: Nov. 24, 1998

[54] ACOUSTIC SOURCE ARRAY SYSTEM FOR UNDERWATER OPERATION

[75] Inventors: John V. Bouyoucos, Pittsford; David C. Charvoz, Fairport; Dennis R. Courtright, Canandaigua, all of N.Y.

[73] Assignee: Hydroacoustics Inc., Rochester, N.Y.

[21] Appl. No.: 859,979

[22] Filed: May 21, 1997

Related U.S. Application Data

[60] Provisional application No. 60/018,586 May 31, 1996.

[51] Int. Cl.⁶ ...................................................... G01V 1/38
[52] U.S. Cl. ............................ 367/15; 367/17; 367/144; 181/110; 114/254
[58] Field of Search ................................ 367/15, 16, 17, 367/144; 181/110; 114/254

[56] References Cited

U.S. PATENT DOCUMENTS

| | | | |
|---|---|---|---|
| 3,604,387 | 9/1971 | Hale | 114/254 |
| 4,072,123 | 2/1978 | Byers | 114/254 |
| 4,312,496 | 1/1982 | Norminton | 254/302 |
| 4,599,712 | 7/1986 | Chelminski | 367/144 |
| 4,648,080 | 3/1987 | Hargreaves | 367/20 |
| 4,660,184 | 4/1987 | Hawkjem et al. | 367/16 |
| 4,693,336 | 9/1987 | Newman | 181/111 |
| 4,710,060 | 12/1987 | Kamarainen | 367/15 |
| 4,716,553 | 12/1987 | Dragsund et al. | 367/15 |
| 4,793,274 | 12/1988 | Regone | 114/242 |
| 4,798,156 | 1/1989 | Langeland et al. | 114/242 |
| 4,958,328 | 9/1990 | Stubblefield | 367/15 |
| 5,138,582 | 8/1992 | Furu | 367/16 |
| 5,157,636 | 10/1992 | Bjerkoy | 367/15 |
| 5,212,669 | 5/1993 | Jenkins | 367/144 |
| 5,263,431 | 11/1993 | Wood | 114/254 |
| 5,469,404 | 11/1995 | Barber et al. | 367/23 |
| 5,506,818 | 4/1996 | Johnston | 367/144 |
| 5,615,170 | 3/1997 | Chelminski | 367/15 |

*Primary Examiner*—J. Woodrow Eldred
*Attorney, Agent, or Firm*—K. LuKacher; M. LuKacher

[57] ABSTRACT

An improved acoustic source array system is provided by the invention to generate acoustic signals underwater. The system has an array of acoustic signal sources, such as air guns, towable while underwater behind a surface vessel. The array includes a plurality of these sources, and spreader bar assemblies including these sources. The sources are attached by these assemblies at predetermined separation distances in the array. The spreader bar assemblies provide manifolds for storing and regulating energy, such as compressed air, to operate the sources. The array is connected to the vessel by an umbilical. The sources are controlled by a shipboard controller for firing the sources to provide acoustic signals underwater at selected times. The array may be towed from the ship with the flat side of the array assuming an angle of approximately 45° or less with respect to a vertical axis. The flat side of the array includes a horizontal axis that is normal to the direction of tow. A drum on the ship stows the spreader bar assembles on flanges of the drum in successive layers and enables the array to be deployed.

29 Claims, 10 Drawing Sheets

ACOUSTIC SOURCE ARRAY SYSTEM FOR UNDERWATER OPERATION

DESCRIPTION

This application claims the benefit of priority from co-pending U.S. Provisional application Ser. No. 60/018,586, filed May 31, 1996.

FIELD OF THE INVENTION

The present invention relates to underwater acoustic signal generation and transmission systems, and particularly to, an array of acoustic sources which are stowable, deployable and recoverable by ship mounted drums. A feature of the invention is to provide for the detection of moving objects utilizing a towed array in combination with a receive array.

BACKGROUND OF THE INVENTION

It is well known to tow underwater an array of acoustic sources, such as air guns, from a ship for underwater exploration. By timed activation of these sources, desired acoustic signals from these sources can be generated. Reflected signals may be detected at receivers, which produce electrical signals providing information about underwater geologic formations or moving objects.

One problem with a typical towed array of acoustic sources is that turbulence caused by dragging the sources underwater can generate instability in the array. Such instability can negatively effect the generation of acoustic signals from the array and cause the array undesirable mechanical stress.

Another problem with a typical towed array of acoustic sources is stowage of the array onboard ship. It is often difficult to stow, deploy and recover the array without damaging its acoustic sources. Further, the mechanism for stowage of the array can take up a great amount of limited shipboard space.

A further problem with such a typical array is that unless the array is properly aligned, the acoustic signals generated by its sources may not have the desired vertical and horizontal directivity underwater.

SUMMARY OF THE INVENTION

It is a principal object of the present invention to provide an improved acoustic source array system which operates underwater.

It is another object of the present invention to provide an improve array of acoustic sources, such as air guns, towable from a ship which produces less turbulence than prior art towed arrays.

It is yet another object of the present invention to provide an improved array of acoustic sources which both reduces the space needed for stowing the array onboard ship and can be stowed, recovered and deployed without damaging the acoustic sources of the array.

It is still a further object of the present invention to provide an improved acoustic source array system in which horizonal and vertical directivity of the acoustic signals produced by the array is controllable.

Briefly described, an acoustic source array system is provided by the invention. This system has an array of acoustic signal sources, such as air guns, towable while underwater behind a surface vessel. The array includes a plurality of these sources, and spreader bar assemblies including these sources. The sources are attached by these assemblies at predetermined separation distances in the array. The spreader bar assemblies provide manifolds for storing and regulating energy, such as compressed air, to operate the sources. The array is connected to the vessel by an umbilical. The sources are controlled by a shipboard controller for firing the sources to provide acoustic signals underwater at selected times.

The system may further include a multiple or spiral flanged drum mounted on the ship for stowage, deployment and recovery of the array.

The umbilical provides compressed air to the sources via energy storing manifolds in the spreader bar assemblies, as well as electrical connections for sending and receiving signals between the controller and individual sources. This cable is connected shipboard to a supply of compressed air and an energy storage.

In operation, the controller transmits electrical signals via the umbilical to control the firing of the sources. The acoustic signal transmissions from the sources may either be a sequence of closely spaced transmissions, which sequence is repeated at extended intervals, or may be single shots repeated at spaced intervals.

BRIEF DESCRIPTION OF THE DRAWINGS

The invention and the features and advantages thereof will be more apparent from the following description and accompanying drawings in which.

DETAILED DESCRIPTION OF THE INVENTION

Referring to FIGS. 1–4, an open, planar array 20 of acoustic impulse sources 32 (or air guns) is shown. Array 20 is configured to be towed underwater from a surface ship or vessel 22 with the flat side 20a of the array assuming a tilt angle (α) of approximately 45° or less with respect to a vertical axis 21 which extends through the top of array 20 substantially perpendicular with water surface 37. Flat side 20a has a horizontal axis that is normal to the direction of tow shown by arrow 38. A drum 24 on ship 22 stows the array 20 and is rotatable to deploy and recover array 20. Drum 24 will be described later in more detail in connection with FIGS. 9 and 10. A receive array 26 may also be towed by ship 22. Receive array 26 may be composed of a plurality of receivers for detecting the reflection of the acoustic signal generated by array 20.

Figure 1:
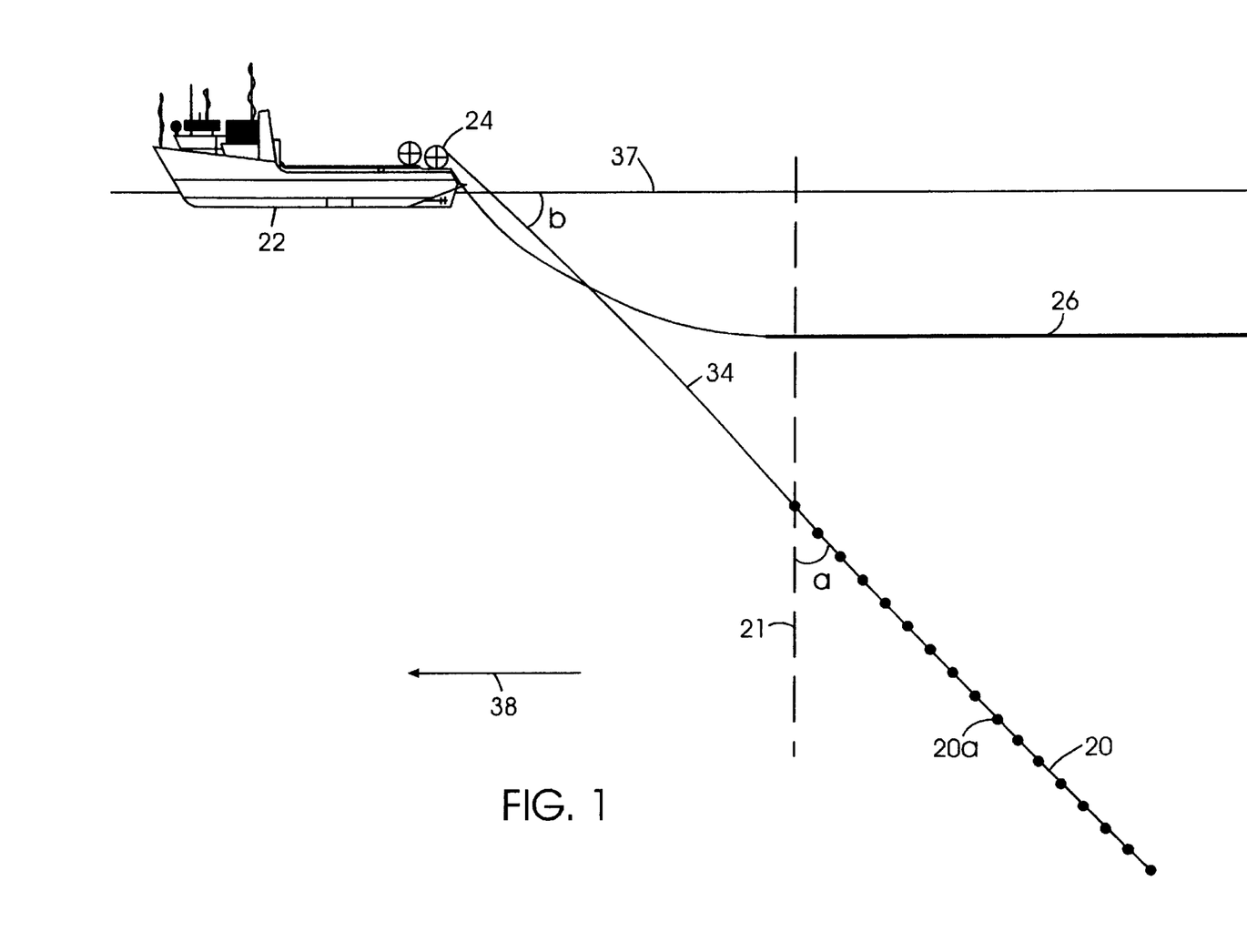
FIG. 1 is a schematic diagram of a towed array system embodying the invention deployed from a towing ship.
Figure 2:
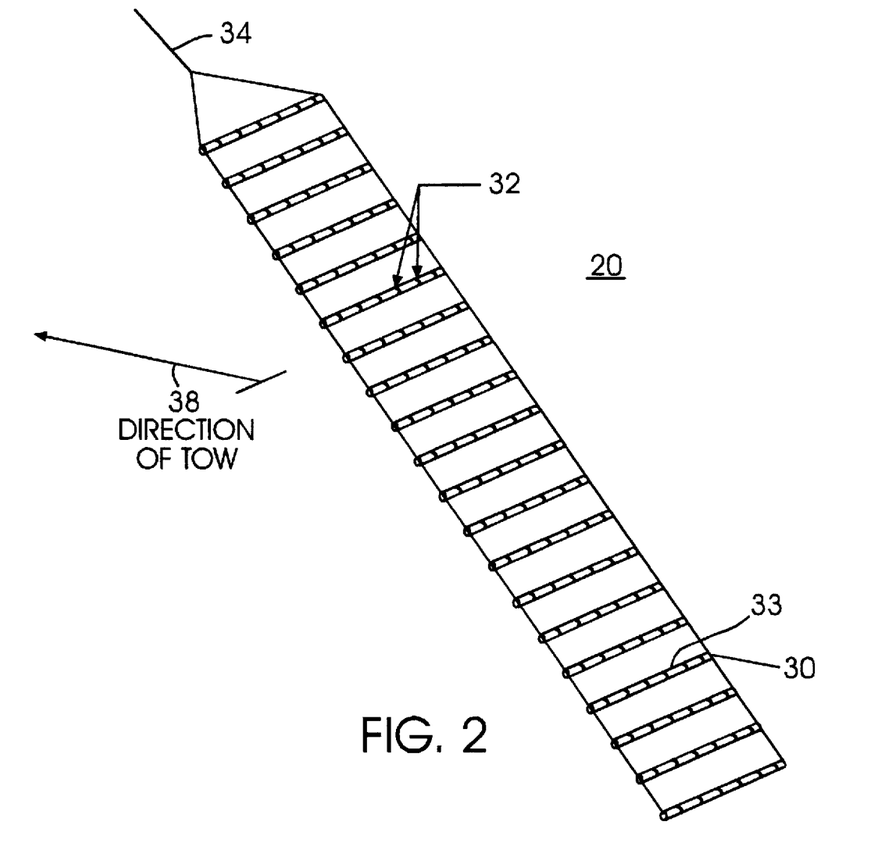
FIG. 2 is a perspective view of the array shown in FIG. 1.
Figure 3:
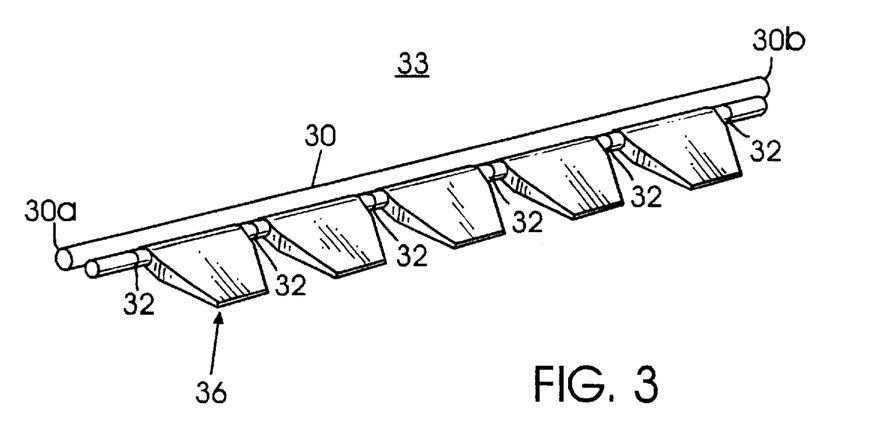
FIG. 3 is a perspective view of one of the spreader bar assemblies of the array shown in FIG. 2.

Array 20 includes a plurality of horizontal spreader bars 30 to which air guns 32 are attached. Each spreader bar 30 and its attached air guns 32 define an integrated spreader bar assembly 33, as shown in FIG. 3. Array 20 is built up of blocks of spreader bar assemblies 33, as shown in FIG. 2. Spreader bars 30 provide a manifold for storing, regulating and conveying compressed air to air guns 32. Air guns 32 are attached by these spreader bars 30 at predetermined separation distances in array. 20.

Figure 4:
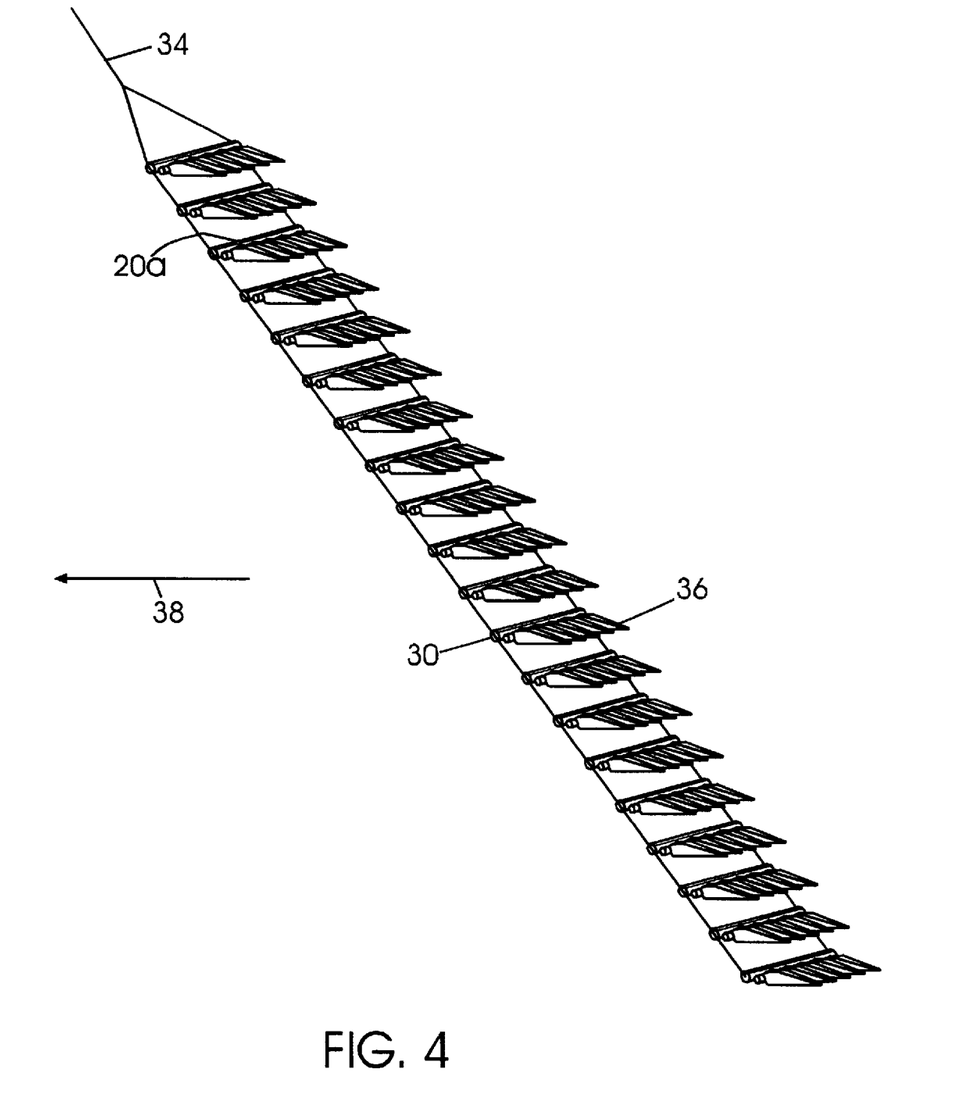
FIG. 4 is a perspective view of the array with the fairings of the spreader bar in extended position during towing.

A flexible umbilical 34 connects array 20 to tow ship 22. Umbilical 34 conveys compressed air through a central hose and electrical power and signal information to spreader bars 30 through conductors integrated into the umbilical construction. Via conductors in umbilical 34 and also in spreader bars 30, electrical firing signals and timing information is provided between ship 22 and the individual air guns 32 of array 20. Umbilical 34 may be part of a tow cable for towing array 20, or a separate tow cable may be used. Both umbilical 34 and the integrated spreader bar assemblies 33 of array 20 are faired using swivel fairings 36 to minimize drag and to increase array stability. Array 20 is shown in FIG. 4 with fairings 36 of spreader bars 30 in extended position during towing.

The tilt angle ($\alpha$) of array 20, nominally 45°, creates "clear water" between the individual spreader bar assemblies 33, thereby minimizing the build up of turbulence and reducing drag. The tilt angle ($\alpha$) from vertical axis 21 is dependent on the array 20 design and the tow speed of array 20 by ship 22. For example, a tilt angle ($\alpha$) of 45° angle may be obtained at a nominal tow speed of about 15 knots. Further, array 20 can operate at any tow angle (b) between approximately 45° and 90° with respect to the horizontal defined by water surface 37, thereby providing a vertical aperture for vertical directivity of the transmissions from array 20.

Figure 5:
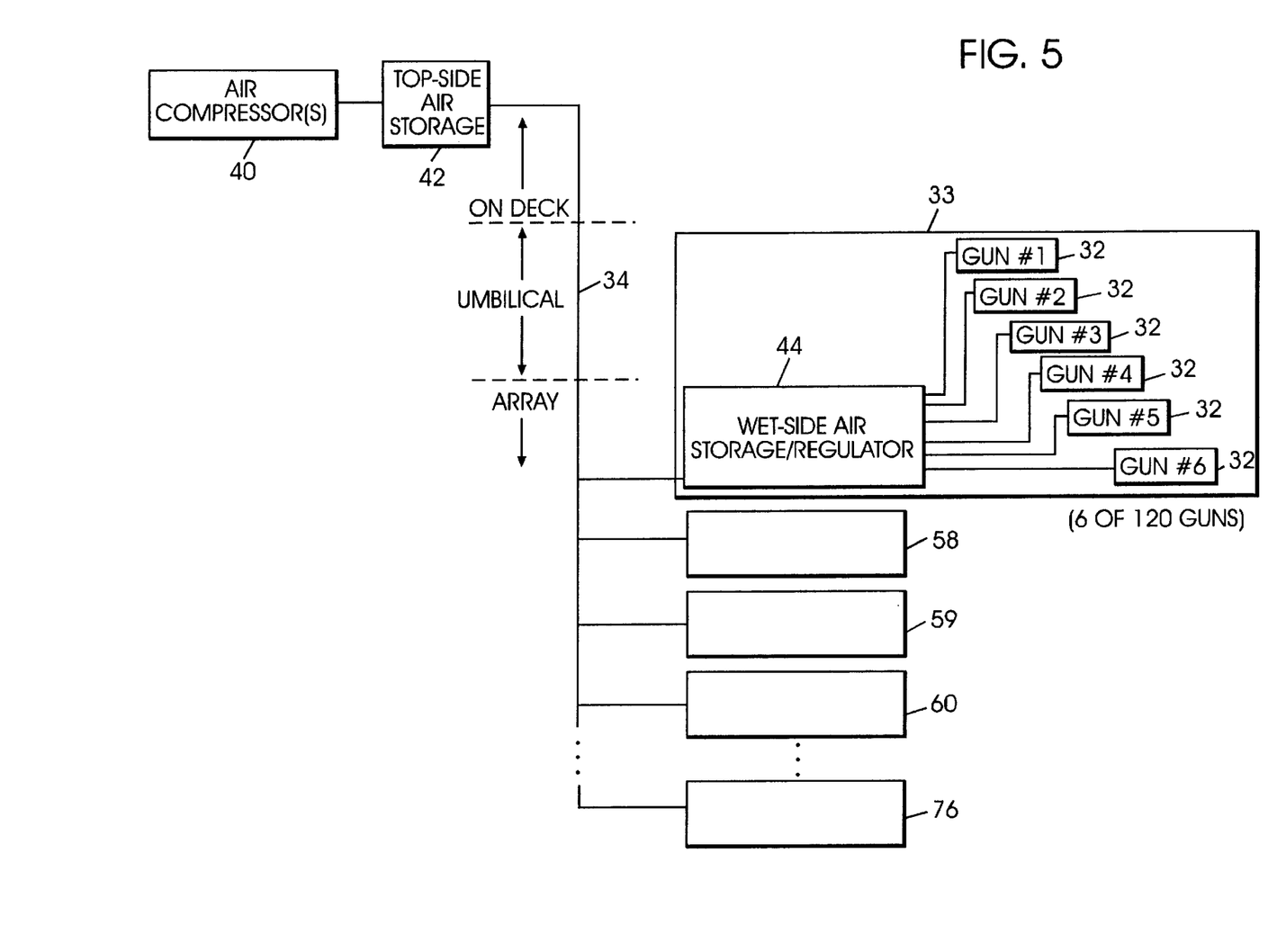
FIG. 5 is a block diagram of the part of the system which supplies compressed air to the air guns of the array.
Figure 8:
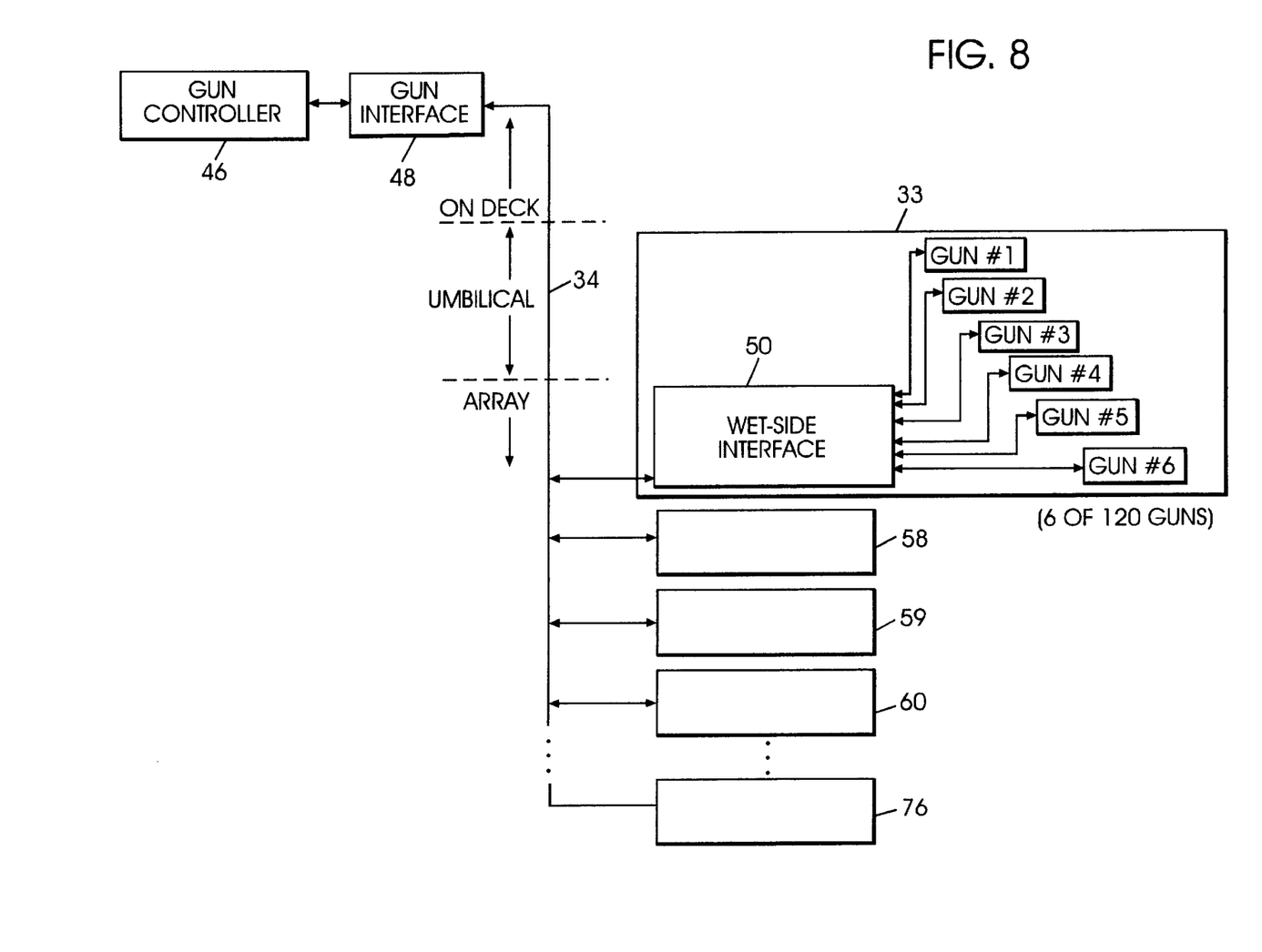
FIG. 8 is an electrical diagram of the system for firing the air guns of the array.

The system for controlling array 20 supplies compressed air (power) to spreader bars 30, and electrical signals to the air guns 32, as shown in FIGS. 5 and 8, respectively. In FIG. 5, the pneumatic power supply for array 20 includes a shipboard air compressor 40, shipboard (top-side) compressed-air storage reservoir 42, and wet-side compressed-air storage reservoir/regulators 44. Wet-side compressed air storage reservoir/regulator 44 both stores and locally regulates the pressure in the manifold of the spreader bar 30 of each assembly 33. FIG. 5 shows an example of a 120 air gun array, in which twenty spreader bar assemblies 33 each have one spreader bar 30 with six air guns 32. In this example, spreader bar assembly 33 is illustrated as the first spreader bar assembly of the array, while the other nineteen spreader bar assemblies are represented by blocks 58, 59, 60, and 76.

Figure 7A:
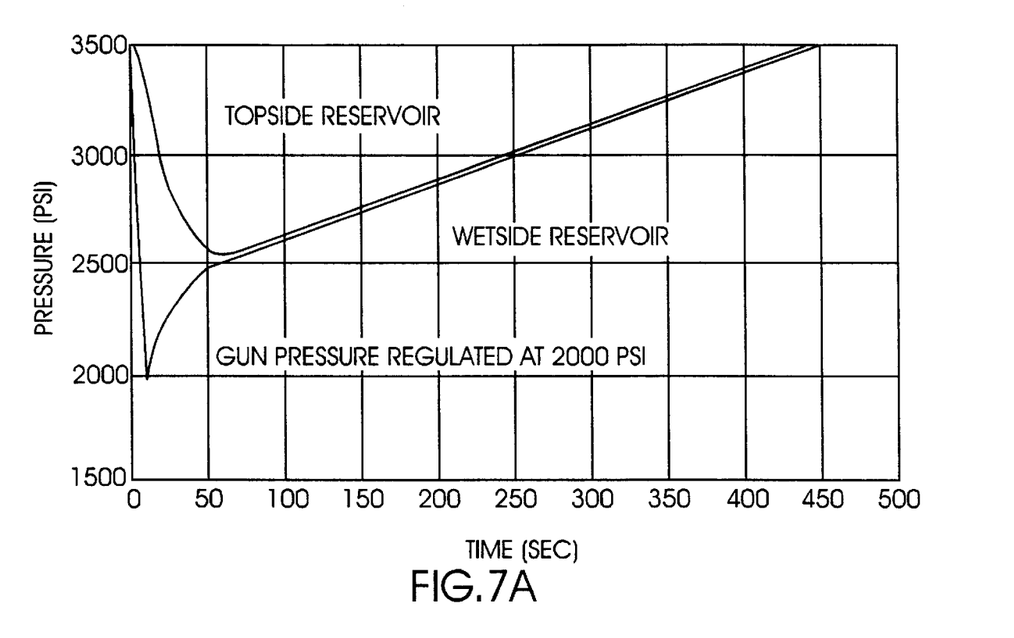
FIGS. 7A and 7B are plots of the pressure in the top-side (aboard ship) and wet-side (underwater) compressed-air storage reservoirs shown in FIG. 5.
Figure 7B:
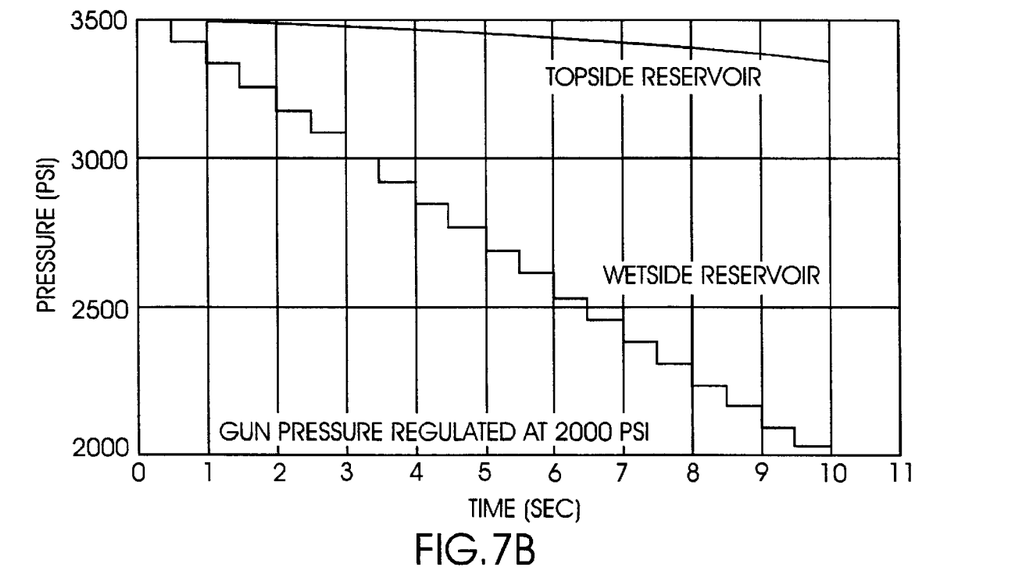

The partitioning of air storage between ship 22 and array 20, along with the localized regulation serves to reduce overall air storage requirements, and minimizes the required size of the air umbilical 34. The pressure in top-side and wet-side air storage reservoirs 42 and 44 of the power supply for a typical shot sequence is shown in FIGS. 7A and 7B.

Referring to FIG. 8, a gun controller 46 provides electrical signals to a gun interface 48 which are transmitted via umbilical 32 to a wet-side interface 50 in each of the spreader bar assemblies 33, i.e., spreader bars 30, for the firing each of the individual air guns 32. Spreader bars 30 also provide electrical interconnects to each gun 32 to provide firing control signals, and to provide sensor information from the individual firing events back to shipboard gun controller 46. The acoustic signal transmissions of the individual air guns 32 may also be time aligned by shipboard controller 46 to provide horizontally directed transmissions, with principal axes directed forward, backward, or to the port or starboard sides of ship 22, selectively. As in FIG. 5, FIG. 8 shows the example of a 120 air gun array, in which twenty spreader bar assemblies 33 each have one spreader bar 30 with six air guns 32. In this example, spreader bar assembly 33 is illustrated as the first spreader bar assembly of the array, while the other nineteen spreader bar assemblies are represented by blocks 58, 59, 60, and 76.

Figure 6A:
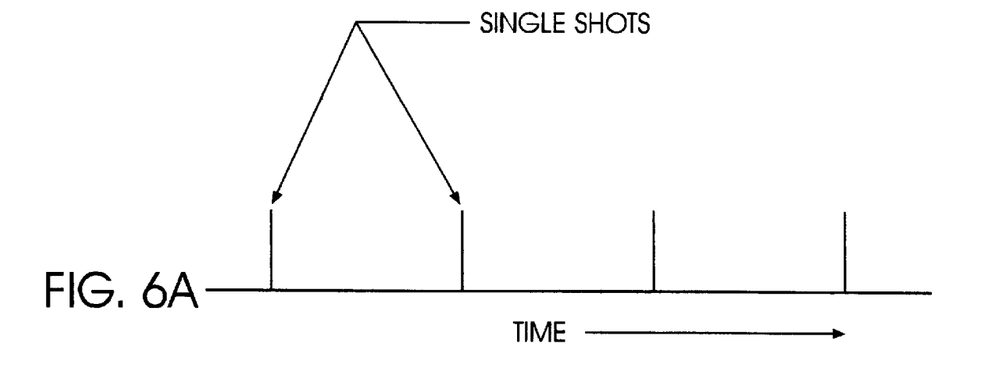
FIGS. 6A and 6B are timing diagrams of single and multiple shot (impulse) sequences from the air guns of the array.
Figure 6B:
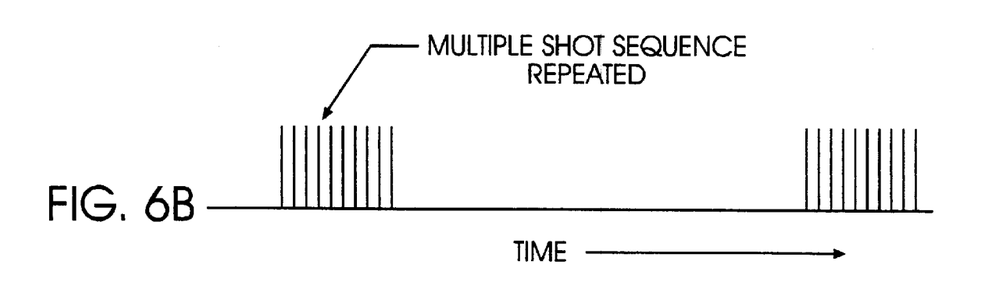

The above system provides for a multiple, closely-spaced sequence of air gun transmissions, such as illustrated in FIGS. 6A and 6B, useful for matched-filter signal processing when used in combination with a suitable receive array 26, particularly for the detection of moving objects, such as submarines, in a reverberation dominated shallow water environment. The sequence of spaced air gun transmissions may include groups of single shots or multiple shots, as shown in FIGS. 6A and 6B, respectively. Other shot sequences or single shots may also be produced.

The towed planar array 20 of air guns 32 may be reeled up on the cylindrical reel (drum) 24 (FIG. 1) which includes multiple or spiral flanges (or shelves) to support ends 30$a$ and 30$b$ (FIG. 3) of spreader bar assemblies 33 or spreader bars 30. The flanges define opposing regions on the sides of drum 24 which receive ends 30$a$ and 30$b$ of the spreader bars when drum 24 is rotated for storing array 20 on ship 22. Array 20 may also be deployed from its stowed position on drum 24 by rotating drum 24, such as in a direction opposite to the direction of rotation when array 20 was stored on the drum. Embodiments of these drums are shown in FIGS. 9A and 9B, and 10A–10D.

Figure 9A:
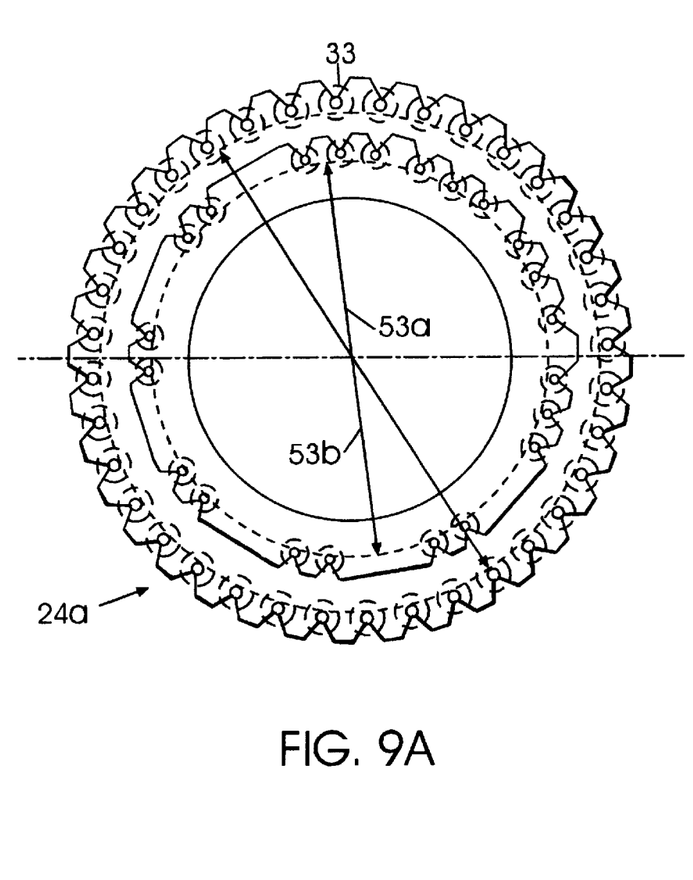
FIGS. 9A and 9B are respectively end and front views of a first embodiment of drum, shown on the ship in FIG. 1, for stowage, deployment and recovery of the array.
Figure 9B:
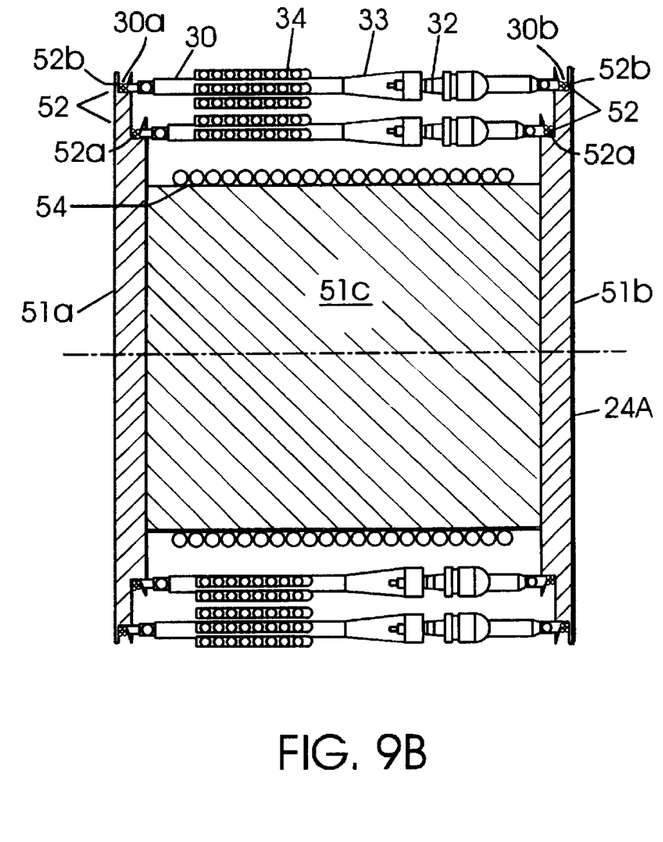

Referring to FIGS. 9A and 9B, a stowage drum 24A having multiple flanges 52 is shown. Drum 24A utilizes at least two pairs of flanges 52 which not only contain a tow cable 54 (which may include umbilical 34) on the center section 51$c$ of the drum, but also support and provide stowage locations for the air guns 32, via their spreader bar assemblies 33, and umbilical 34. The diameter (or height) of each pair of flanges 52 on drum 24A is designed for providing clearance between each successive layer of air guns 32 or spreader bar assemblies 33. Spreader bar assemblies 33 are stored in groups on drum 24A, where each group is stored in a layer on a different pair of flanges 52. To accommodate multiple layers of spreader bars 30 nesting on drum 24A, each group of spreader bars 30 has bars of approximately the same length (i.e., the distance between ends 30$a$ and 30$b$), and the length of bars in different groups is sequentially reduced from the bottom to the top of array 20.

In the illustration of drum 24A shown in FIGS. 9A and 9B, two pairs of flanges 52$a$ and 52$b$ each have different drum diameters 53$a$ and 53$b$, respectively, and each pair of flanges defines two shelves of the same drum diameter on opposing sides 51$a$ and 51$b$ of drum 24A. For example, pair of flanges 52$a$ define two shelves of drum diameter 53$a$ capable of storing one layer of spreader bar assemblies 33, and pair of flanges 52$b$ define two shelves of drum diameter 53$b$ capable of storing another layer of spreader bar assemblies 33. The length of bars 30 in array 20 stowable on the pair of flanges 52$a$ are reduced from bars 30 stowable on the pair of flanges 52$b$. Although two pairs of flanges 52 are shown, additional pairs of flanges may be used to store additional layers of spreader bar assemblies 33.

Figure 10A:
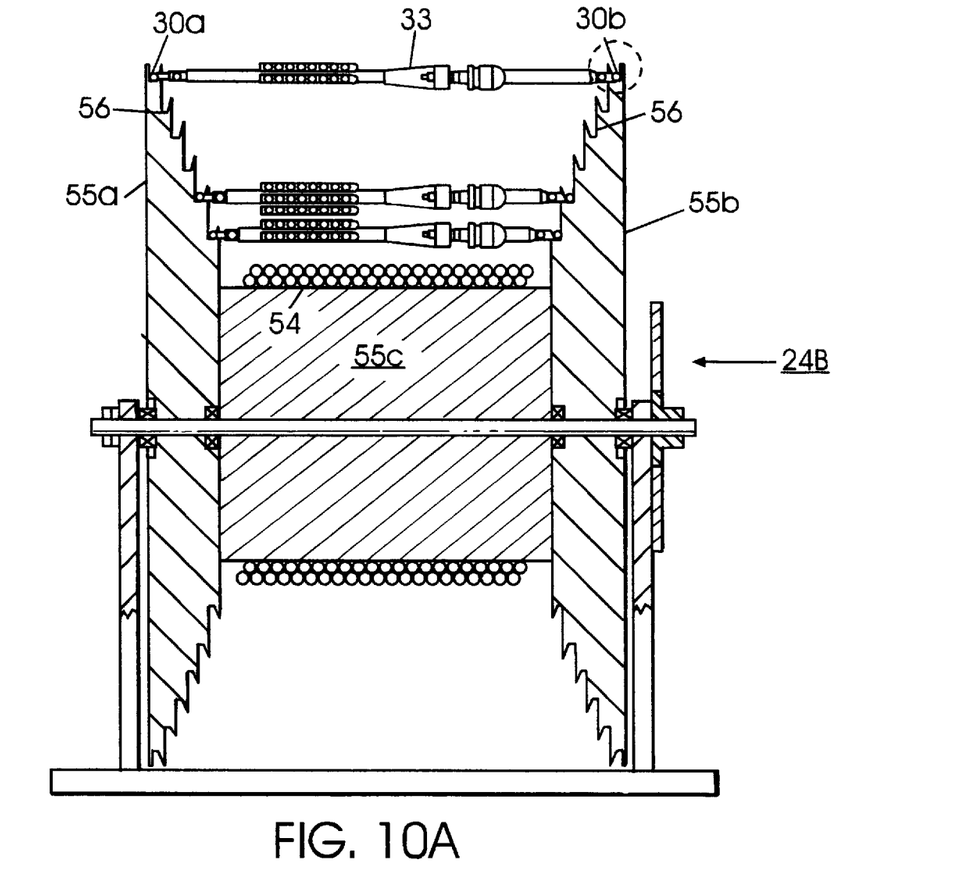
FIGS. 10A, 10B, 10C, and 10D are respectively front, top, enlarged fragmentary and side views of a second embodiment of the drum shown in FIG. 1.
Figure 10B:
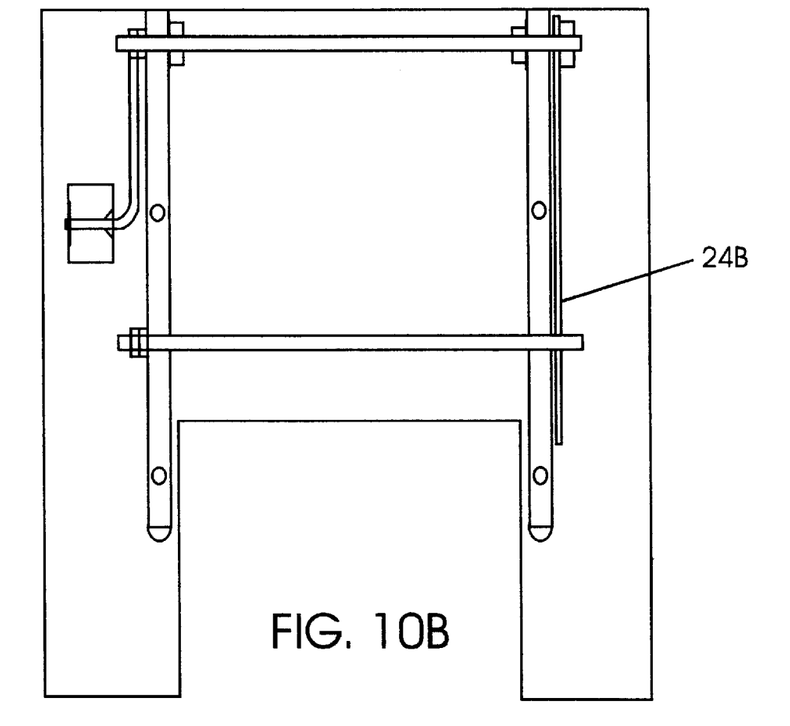
Figure 10C:
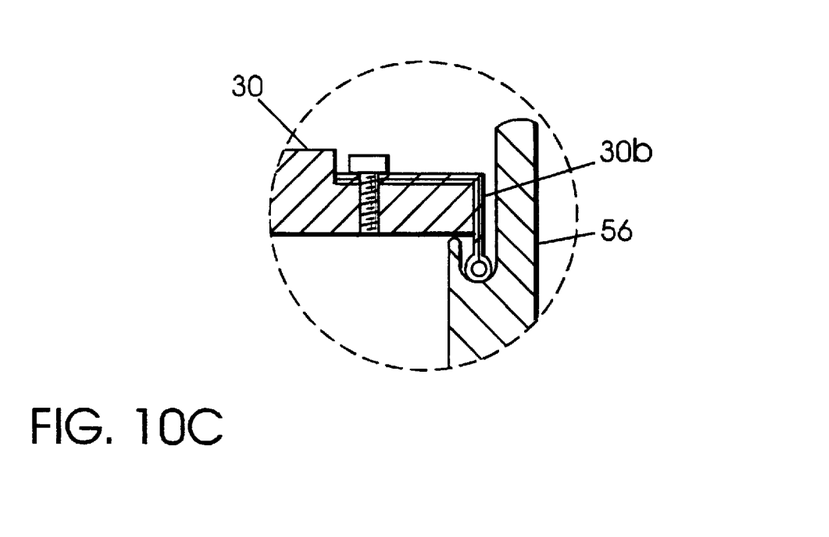
Figure 10D:
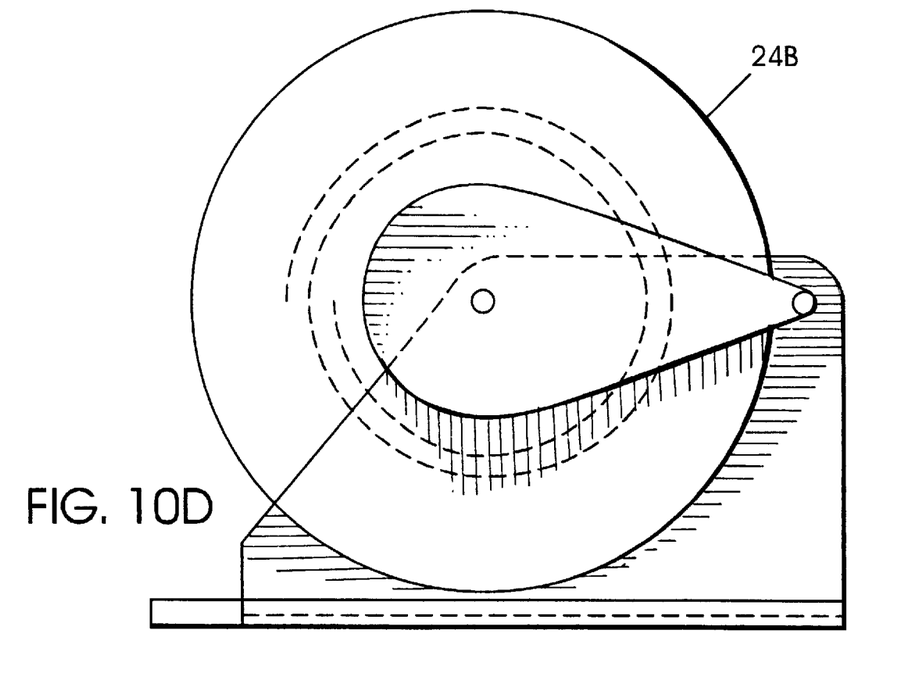

Referring to FIGS. 10A–10D, a drum 24B is shown having a continuous spiral flange 56 on each side 55a and 55b of the drum. The continuous flange 56, for example, may be created by cutting a conical, helical groove at a certain pitch which provides clearance between air gun 32 on spreader bar assemblies 33. The spiral flanges 56 define continuous spiral shelves (or regions) on each opposing side 55a and 55b of drum 24B which are progressively narrowed in separation as the outer turns (defined by the spiral flanges) on the drum reduce in diameter. Accordingly, shelves on opposing sides 55a and 55b of drum 24B which receive different spreader bars have different diameters (or heights) to allow the bars to nest in multiple layers when the drum is rotated. To accommodate multiple layers of spreader bars 30 on drum 24B, the length of the bars 30 is deliberately and sequentially reduced from the bottom of array 20 to the top so that spreader bar assemblies 33 can properly nest in the spiral flanges of the drum. Tow cable 54, which may include umbilical 34, is reeled on the center section 55c of drum 24B, as shown in FIG. 10A. Drums 24A and 24B are not limited to storing guns 32 shown in spreader bar assemblies 33 of FIG. 3, but may store any array having spreader bars 30 with one or more guns 32. For example, FIG. 9B shows spreader bars 30 each with a single gun 32.

To reiterate, the acoustic array 20 provided by the invention is adapted for towing in a stable configuration at a selected nominal depth behind a surface vessel 22. The array 20 is made up of a plurality of air guns (impulse sources) 32 configured over a planar surface having both vertical and horizontal extent for providing acoustic transmit signals (or beams) having both vertical and horizontal directivity. The air guns 32 are controlled by shipboard controller 46 to selectively time-align the transmitted impulses from the guns 32 to provide horizontal transmitted beams having a main axis oriented forward, backwards, or to either side of towing ship 22. The array 20 has spreader bars 30 to which the air guns 20 are attached at pre-determined separation distances. The spreader bars 30 incorporate an energy storage/regulator 44 for gas under pressure and pressure regulation for supplying the multiplicity of air guns 32 at a constant pressure. The spreader bars 30 also provide electrical interconnects to each gun 32 to provide firing control signals as well as sensor information from the individual firing events back to shipboard controller 46. Array 20 includes individual tapered-fairings 36 that are integrated with the air guns 32 and spreader bars 30 in spreader bar assembly 33 to reduce drag and to stabilize the array 20 under tow. The array 20 is connected to ship 22 by umbilical 34 that provides compressed air to air guns 32 via the energy storage in the spreader bars 30, as well as electrical signal control and feedback for the individual air guns 32 to controller 46.

Variation and modification in the herein described system within the scope of the invention will undoubtedly suggest themselves to those skilled in the art. Accordingly, the foregoing description should be taken as illustrative and not limiting.

What is claimed is:

1. And acoustic source array system compromising:
   an array of acoustic signal sources towable while underwater behind a surface vessel, said array having a plurality of said sources, spreader bar assemblies including spreader bars to which said sources are attached at predetermined separation distances, wherein said spreaders bars provide manifolds which provide means for storing energy which operates said sources;
   an umbilical connecting said arrays to said vessels; and
   means for firing said sources to provide acoustic signals at selected times.

2. An acoustic source array system comprising:
   an array of acoustic signal sources towable under water behind a surface vessel, said array having a plurality of said sources spreader, bar assemblies including said sources and to which said sources are attached at predetermined separation distances, said spreader bar assemblies providing manifolds for storing energy which operate said sources;
   an umbilical connecting said array to said vessel;
   means for firing said sources to provide acoustic signals at selected times; and said system
   further comprising a drum having flanges which accommodate multiple layers of said spreader bar assemblies.

3. The system according to claim 2 wherein the length of said spreader bar assemblies are reduced progressively along said array from a bottom to a top of the array, respectively further and closer to said vessel, to accommodate nesting of said spreader bar assemblies on the flanges of the drum.

4. The system according to claim 2 wherein said flanges defines two opposing spiral shelves and said spiral shelves are progressively narrowed in separation as outer turns on the drum reduce in diameter.

5. The system according to claim 2 wherein said flanges define multiple pairs of shelves in which each pair of shelves accommodates one of said multiple layers of said spreader bar assemblies.

6. The system according to claim 5 wherein said each of said multiple pairs of shelves accommodates spreader bar assemblies of approximately the same length, and different said pairs of shelves accommodates spreader bar assemblies of different lengths.

7. The system according to claim 2 wherein said spreader bar assemblies represent different groups of spreader bar assemblies, and the length of said spreader bar assemblies in different said groups are reduced progressively along said array from a bottom to a top of the array, respectively further and closer to said vessel, to accommodate nesting of the spreader bar assemblies on the flanges of the drum.

8. The system according to claim 1 wherein said umbilical comprises a plurality of fairings.

9. The system according to claim 1 wherein said sources are air guns and said energy is compressed air.

10. The system according to claim 1 wherein said spreader bar assemblies further comprise a plurality of fairings.

11. The system according to claim 1 wherein said umbilical provides energy to the sources via said manifolds provided by the spreader bar assemblies, and electrical connections for sending and receiving signals between said controller and said sources.

12. The system according to claim 1 wherein said umbilical is connected on the vessel to a supply of compressed air with energy storage.

13. The system according to claim 1 wherein said firing means further comprising means for transmitting electrical signals via the umbilical to control the firing of the sources.

14. The system according to claim 1 wherein said system responsive to said firing means produces acoustic signals from said sources which define a sequence of spaced signal transmissions from said sources, and said sequence comprises groups of one or more shots.

15. The system according to claim 1 wherein said system responsive to said firing means produces acoustic signals from said sources which define a shot from said sources.

16. An acoustic source array system comprising:

an array of acoustic signal sources towable underwater behind the surface vessel, said array having a plurality of said sources, spreader bar assemblies including said sources and to which said sources are attached at predetermined separation distances, said spreader bar assemblies providing manifolds for storing energy which operate said sources;

an umbilical connecting said array to said vessel;

means for firing said sources to provide acoustic signals at selected times; and wherein said array and towed is at an angle of approximately 45° or less with respect to a vertical axis which extends through said array, and said array has a flat side which is normal to the direction of the tow.

17. The system according to claim 16 wherein said angle is responsive to the speed of said tow.

18. The system according to claim 1 wherein said system further comprises means for controlling the directivity of said acoustic signals.

19. The system according to claim 1 further comprising a receiver array for detecting the reflection of said acoustic signals.

20. The system according to claim 1 wherein said acoustic signals from said sources are impulse signals.

21. The system according to claim 1 wherein said spreader bar assemblies each further comprise a spreader bar attached to one or more said sources.

22. An acoustic source array towable underwater behind a surface vessel comprising:

a plurality of acoustic sources;

a plurality of assemblies comprising spreader bars including said sources; and an umbilical connecting said array to said vessel for supplying energy, and electrical signals to said sources via said spreader bars, wherein said array accommodates storage of the spreader bar assemblies on flanges of a reel located on the vessel.

23. The acoustic source array according to claim 22 wherein said spreader bars enable storage and regulation of energy from said cable to said sources, and electrical signals from said cable to said sources for firing said sources.

24. The acoustic source array according to claim 22 wherein said spreader bar assemblies further comprises a plurality of fairings.

25. The acoustic source array according to claim 22 wherein said array when towed is at an angle of approximately 45 degrees or less with respect to a vertical axis which extends through said array.

26. The acoustic source array according to claim 22 wherein said sources are air guns and said energy is compressed air.

27. An apparatus for storing an array having multiple spreader bars and a cable connected to the array, said apparatus comprising:

a drum having opposing regions which receive opposite ends of the spreader bars; and said opposing regions which receive different spreader bars having different heights to accommodate nesting of multiple layers of the spreader bars when said drum is rotated.

28. The apparatus according to claim 27 wherein said opposing regions are spaced apart in accordance with the lengths of the spreader bars.

29. The apparatus according to claim 27 wherein said drum further comprises a central region which receives the cable when said drum is rotated.

* * * * *